Patented Nov. 20, 1951

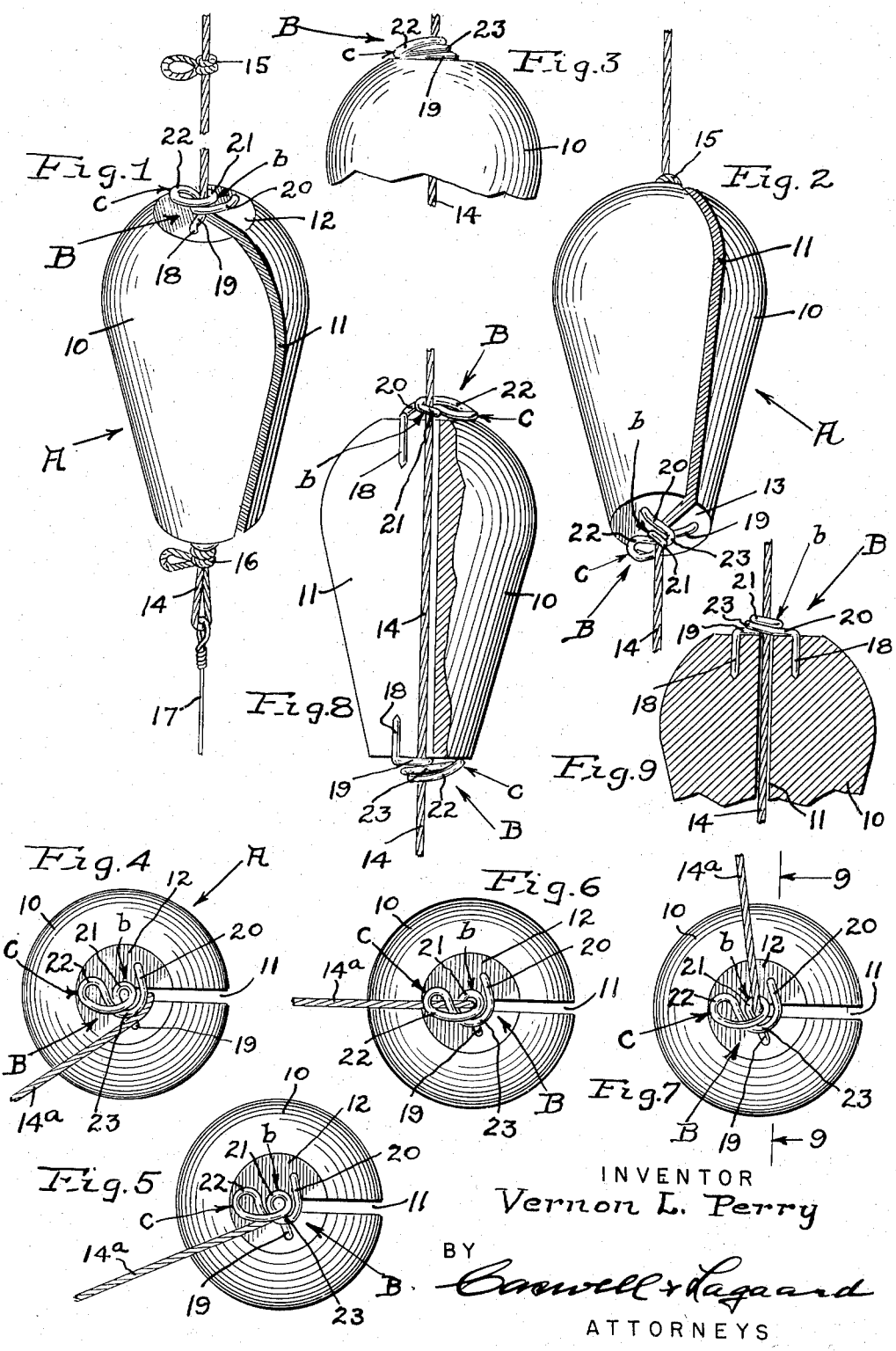

2,575,832

UNITED STATES PATENT OFFICE 2,575,832

BOBBER FOR FISH LINES

Vernon L. Perry, Minneapolis, Minn.

Application August 23, 1948, Serial No. 45,615

3 Claims. (Cl. 43—44.9)

My invention relates to improvements in bobbers for fish lines, especially casting lines, an object of the invention being to provide a bobber of simple, durable and inexpensive construction adapted to be quickly and easily applied to a line and removed therefrom and adapted, when applied, to slide freely along the line between knots therein or other stops thereon.

More specifically, it is an object of my invention to provide an improved bobber of the instant nature having a longitudinally kerfed body and end guides thereon, each of which consists of a length of bent wire anchored at its ends in said body and intermediately formed with a volution to provide an eye for a line slidably accommodated in the kerf in said body, such eye having a side opening therein for the threading of the line into the eye and the unthreading of the line from the eye.

A further object of the invention is to include in the wire of an end guide a second volution formed to provide a yielding guard serving normally to keep the threaded line from swinging into a position enabling it to pass out of the side opening in said first eye-forming volution in which the line is threaded.

Another object of the invention is to provide in the bent wire of an end guide certain portions thereof which constitute two jaw members, one being yieldable and the two thereof together operating as a safety catch to prevent accidental unthreading of the line from the eye upon failure of the guard to fend the line away from the side opening in said eye.

A feature of the invention resides in forming end guides for bobbers of the instant nature so that in each thereof the movement of the yielding guard and of the yielding jaw member, under a wedging action of the line in threading and unthreading the same, is derived by flexing a substantial portion of wire, whereby the line is saved against injury upon its application to and removal from said end guides.

Other objects of the invention reside in the novel combination and arrangement of parts and in the details of construction hereinafter illustrated and/or described.

In the drawing, Fig. 1 is a perspective view of a bobber constructed in accordance with my invention, the same being shown as applied to a fish line; Fig. 2 is a perspective view of the bobber and line shown in Fig. 1, but taken at a different angle; Fig. 3 is a fragmentary elevational view of the bobber and line shown in Fig. 1; Figs. 4, 5, 6 and 7 are plan views of the bobber and line shown in Fig. 1, the line in each view being shown in a particular position relative to the upper end guide, said series of views illustrating various stages in the threading of the line into the eye of the end guide; Fig. 8 is an elevational view of the bobber and line shown in Fig. 1, said view being partly broken away, and Fig. 9 is a fragmentary elevational sectional view taken as on the line 9—9 of Fig. 7.

Referring to the drawing, it will be noted that my improved bobber, designated in its entirety by the letter A, includes an elongated body 10 formed with a kerf 11 in the side thereof which extends from top to bottom of said body. This body 10 is constructed of buoyant material such as wood or other suitable material and is enlarged at its upper portion to cause the article to float in an upright position. The kerf 11 is cut back into the body 10 from the periphery thereof slightly beyond the axis of said body. The upper end 12 of the body 10 is flat and so also is the lower end 13 thereof.

A pair of end guides B are attached to the body 10 as best seen in Figs. 1 and 2. These guides are identical, one thereof being attached to the upper end 12 of the body 10 and the other thereof being attached to the lower end 13 of said body. Each guide B includes an eye b for slidably receiving therein a line 14 extending longitudinally of the body 10 along the crotch of the kerf 11, said kerf being of a width freely to receive the line 14 laterally thereof and freely to admit of the lengthwise sliding of the line therealong between the end guides B.

The line 14 is fitted with spaced upper and lower stops 15, 16 which, as shown, are in the form of knots in the line. The lower stop 16 is located adjacent to the end of the line to which the leader 17 for a hook is attached, while the upper stop 15 is located higher up along the line, and more or less so, depending upon the depth at which the hook (not shown) on the leader 17 is to be supported by the bobber A.

In use, the bobber A slides along the line 14 to the lower stop 16 thereon when the line is drawn from the water and, in such position on said line, the bobber A serves as a weight for the line in casting it back into the water. Having cast the line into the water, the bobber A will float, while the line 14, weighted at the leader 17, will slide down through the bobber until the upper stop 15 on the line engages the upper guide B of the bobber. Thereupon, the paying out of the line 14 will cease and the hook on the leader 17 will be supported at a depth predetermined by the location of the upper stop 15 on the line.

The instant bobber is constructed to enable an angler to apply it to a line quickly and easily and, similarly, to remove it from the line. This application of the bobber A to a line and its removal therefrom entails the threading and unthreading of the line into and from the eyes b of the end guides B. Each of these eyes b has a side opening therein, as will later appear in detail, to facilitate the threading thereinto and the unthreading therefrom of a line accommodated within the kerf 11 and, additionally, each of said eyes b has yielding means associated therewith for normally barring the line 14 against passage through the side opening in the eye to unthread the same, such yielding means being actuated by a wedging action exerted by the line itself to free the line from the eye. To minimize the injurious wearing of a line in applying the bobber A to and removing it from the line, I have taken special precaution in the construction of the end guides B, the following description of one of which will suffice for both.

Each end guide B consists of a piece of somewhat resilient wire, bent so that the terminal portions thereof are parallel with and spaced apart from each other to constitute anchoring studs 18 which are sunk into the body 10 longitudinally thereof at opposite sides of the kerf 11. The end portions of said wire, next to the studs 18 are disposed at right angles to said studs, laterally of the body 10, and extend toward the crotch of the kerf 11, one of said end portions constituting a rail 19 and the other a reach 20. Intermediately, said wire is shaped to include two juxtaposed volutions 21 and 22, the volution 21 being in continuation of the rail 19 and coiled helically away from the body 10, said volution 21 forming the eye b with an open side opening therein facing in the direction of the rail 19 and with the axis of the eye b aligned with the kerf 11 longitudinally of the body 10. The second volution 22 is in continuation of and disposed alongside said first volution 21 and is coiled helically toward and into close proximity to the end of the body 10, said second volution 22 forming a guard c facing in opposition to the side opening in the eye b and adapted normally to keep the threaded line from swinging into a position enabling it to pass out of said side opening in said eye b. Joining said second volution 22 and said reach 20 is a run 23 which traverses and overrides the rail 19 at a point in front of the side opening in the eye b. This run 23 and said rail 19 constitute jaw members, the former being yieldingly movable out of contact with the latter to enable the line to be swung through the "bite" of said jaw members in the threading of the line 14 into the eye b and the unthreading of the line from said eye.

Starting with Fig. 4 of the series of figures numbered 4 to 7, inclusive, the handling of the line 14 in its application to the end guide B at the top of the body 10 will be readily comprehended. With said line 14 strung through the kerf 11, that portion 14a of the line next above the body 10 will be brought down and tensioned in position extending laterally of the body and riding the rail 19 transversely thereof (Fig. 4). Thence, said portion 14a of the line 14, while still tensioned, will be swung in a clock-wise direction, as seen in Fig. 5, to draw said line inwardly along the rail 19, thence between said rail 19 and the run 23 or, in other words, through the "bite" of the jaw members constituted by said rail 19 and run 23 (Fig. 5). Thereupon, the portion 14a of the line 14 enters the eye b through the side opening therein and, upon continued clock-wise swinging movement, wedges beneath the guard c (Fig. 6), flexing said guard away from the end 12 of the body 10 to make room for said line to pass between said guard c and body 10 and thus assume ultimate threaded position (Fig. 7). In the normal use of the bobber A, the guard c deflects the portion 14a of the line 14 away from the body 10 keeping it from assuming a position wherein it can pass out of the side opening in the eye b. However, upon tensioning said portion 14a of the line 14, as shown in Fig. 7, and swinging it in a counter-clockwise direction, said portion of said line may be wedgedly drawn between the yielding guard c and body 10 (Fig. 6) into position to be freed from the side opening in the eye b (Fig. 5), and thence may be withdrawn through the "bite" of the jaw members constituted by the rail 19 and run 23 and which form the safety catch normally serving to keep the line 14 from being unthreaded from said eye b in the event of failure of the guard c to bar the portion 14a of the line against assuming a position enabling it to pass out of the side opening in said eye b.

An important feature of the instant end-guide construction resides in the relatively long portions of wire employed and which are flexed when the guard c is sprung away from the body 10 and when the jaw-forming run 23 is sprung away from the jaw-forming rail 19 by the tensioned line. This provision, while accomplishing the intended purposes of the guard c and of the jaw-forming run 23, enables both of them to be readily flexed by the tensioned line 14 without injury to the line.

Changes in the specific form of my invention, as herein described, may be made within the scope of what is claimed without departing from the spirit of my invention.

Having described my invention, what I claim as new and desire to protect by Letter Patents is:

1. A bobber for fish lines comprising an elongated buoyant body adapted to float uprightly and having a kerf in the side thereof extending from end to end of said body freely to receive a line, end guides, one on the upper end and one on the lower end of said body, each guide consisting of a piece of bent wire, the terminal portions of said wire being sunk into the body longitudinally thereof at opposite sides of the kerf therein and providing anchoring studs for said guide, the end portions of said wire, next to said anchoring studs, constituting a rail and a reach extending toward said kerf laterally of the body, the intermediate portion of said wire including two juxtaposed volutions, one in continuation of the rail coiled helically away from the body and providing an eye with a side opening therein for the threading and unthreading of the line into and from the eye, said eye being axially aligned with said kerf longitudinally of the body slidably to accommodate the line threaded in the eye and running along said kerf, the side opening in said eye facing in the direction of said rail, the second volution being in continuation of the first volution and coiled helically toward the body into close proximity thereto to provide a guard adapted normally to fend the threaded line against swinging into a position enabling the line to pass out of the side opening in said eye, but being yieldable under pressure of the line to free the line for swinging movement between itself and said body into said position, said intermediate portion of said wire further including a run between said second volution and said reach, said run traversing and overriding the rail in front of the side opening in said eye, said rail and run constituting coacting jaw members, said run being yieldingly movable out of contact with the rail to enable the line to be swung through the bite of said jaw members into and out of the side opening in said eye in the threading of the line into the eye and the unthreading of the line from said eye, said jaw members providing a safety catch to prevent the accidental unthreading of the line from the eye upon failure of the guard to fend the line away from position wherein it is enabled to pass out of the side opening in said eye.

2. A bobber for fish lines comprising an elongated buoyant body adapted to float uprightly and having a kerf in its side extending from end to end thereof freely to receive a line axially of said body, end guides, one on the upper end and one on the lower end of said body, each guide consisting of a piece of bent wire, the terminal portions of said wire being sunk into the body longitudinally thereof to one side of its axis at opposite sides of the kerf therein and providing anchoring studs for said guide, the end portions of said wire, next to said anchoring studs, constituting a rail and a reach extending toward said kerf laterally of the body, the intermediate portion of said wire including two juxtaposed volutions, each a complete convolution, one thereof being in continuation of the rail and coiled helically away from the body and providing an eye with a side opening therein for the threading and unthreading of the line into and from the eye, said eye being coaxially disposed relative to the body slidably to accommodate the line threaded in the eye and running along said kerf, the second volution being in continuation of the first volution and coiled helically toward the body, said second volution being sidewise offset from said eye to the side of the axis of said body opposite said anchoring studs, said second volution at a point intermediately thereof engaging said body and providing a guard adapted normally to fend the threaded line against swinging between it and said body into a position enabling the line to pass out of the side opening in said eye, said second volution being yieldable under pressure of the line to free it for such swinging movement into such position enabling it to pass out of said side opening in said eye, said intermediate portion of said wire further including a run of substantial length between said second volution and said reach.

3. A bobber for fish lines comprising a buoyant body having a kerf in its side extending from top to bottom thereof freely to receive a line axially of said body, end guides, one at the top and one at the bottom of said body each guide consisting of a piece of bent wire, the terminal portions of said wire being sunk into the body longitudinally thereof to one side of its axis at opposite sides of the kerf therein and providing anchoring studs for said guide, the end portions of said wire, next to said anchoring studs, constituting a rail and a reach extending toward said kerf laterally of the body, the intermediate portion of said wire including two juxtaposed volutions, each a complete convolution, one thereof being in continuation of the rail and coiled helically away from the body and providing an eye with a side opening therein for the threading and unthreading of the line into and from the eye, said eye being coaxially disposed relative to the body slidably to accommodate the line threaded in the eye and running along said kerf, the second volution being in continuation of the first volution and coiled helically toward the body into close proximity thereto, said second volution being offset from said eye to the side of the axis of said body opposite said anchoring studs and constituting a guard adapted normally to fend the threaded line against swinging between it and said body into a position enabling the line to pass out of the side opening in said eye.

VERNON L. PERRY.

REFERENCES CITED

The following references are of record in the file of this patent:

UNITED STATES PATENTS

| Number | Name | Date |
| --- | --- | --- |
| 2,106,618 | Mehaffey | Jan. 25, 1938 |